(12) United States Patent
Li

(10) Patent No.: US 6,912,542 B2
(45) Date of Patent: Jun. 28, 2005

(54) METHOD FOR IMPLEMENTING FAST TYPE CHECKING

(75) Inventor: Xiao Feng Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 09/964,724

(22) Filed: Sep. 26, 2001

(65) Prior Publication Data

US 2003/0061230 A1 Mar. 27, 2003

(51) Int. Cl.[7] .................................................. G06F 7/00
(52) U.S. Cl. ................................................... 707/103 R
(58) Field of Search ................................. 707/103 R, 1, 707/513; 709/203; 711/100; 714/15; 719/310

(56) References Cited

U.S. PATENT DOCUMENTS

| | | | | |
|---|---|---|---|---|
| 4,945,475 A | * | 7/1990 | Bruffey et al. .................. 707/1 |
| 5,793,965 A | * | 8/1998 | Vanderbilt et al. .......... 709/203 |
| 5,819,283 A | * | 10/1998 | Turkowski .............. 707/103 R |
| 6,427,123 B1 | * | 7/2002 | Sedlar ........................... 702/2 |
| 6,631,478 B1 | * | 10/2003 | Wang et al. ................... 714/15 |
| 6,687,760 B1 | * | 2/2004 | Bracha ........................ 719/310 |
| 2002/0021788 A1 | * | 2/2002 | Kasvand et al. .......... 379/32.02 |
| 2003/0014442 A1 | * | 1/2003 | Shiigi et al. ................. 707/513 |
| 2003/0065874 A1 | * | 4/2003 | Marron et al. ............... 711/100 |

* cited by examiner

*Primary Examiner*—Safet Metjahic
*Assistant Examiner*—Etienne P LeRoux
(74) *Attorney, Agent, or Firm*—Blakely, Sokoloff, Taylor & Zafman LLP

(57) ABSTRACT

A method for allowing faster data structure type checking. In one embodiment, successive type hierarchy references corresponding to a data object are cached within the data structure of the data object. The data structure may include a sub-root log to store successive supertypes (type hierarchy references) of the data structure type hierarchy. This allows for fast type checking as only the sub-root log need be accessed to determine class membership. In one embodiment, three fields are used to store the three successive references to a given type's supertype hierarchy. In an alternative embodiment, all references to a given type's supertype hierarchy may be stored in a type data structure. In another alternative embodiment, the number of type hierarchy references used may be dynamically determined at run time for a given application.

23 Claims, 4 Drawing Sheets

METHOD FOR IMPLEMENTING FAST TYPE CHECKING

FIELD OF THE INVENTION

The present invention relates generally to the data structures of object-oriented languages, and more specifically to methods and apparatuses to provide faster data structure type checking.

BACKGROUND OF THE INVENTION

Object-oriented computer programming languages such as JAVA and C# typically employ type hierarchies (concept 'type' and 'class' can be used interchangeably in this document). In computer languages, types are used to describe a given entity. For example, a computer language may employ a data structure having various fields used to describe the subject type. The information contained within the fields uniquely defines the type. Normally, types have hierarchy, i.e., one type can be a subtype or supertype of another, e.g., type "apple" is a subtype of type "fruit", and is a supertype of type "red apple". Once the type is determined for some data in computer memory, it may be necessary to determine whether that type is a subtype of another type. The type hierarchy may be viewed as a type tree having a root type base with subtypes of the root type, and subtypes of the subtype, etc. At run time, these languages determine if one type is a subtype of another. Type checking is a very common operation in object-oriented languages. This checking is accomplished through use of instructions at runtime, e.g., in virtual machines.

FIG. 1 illustrates a type checking process in accordance with the prior art. The system 100, shown in FIG. 1, includes data structures 105 through 109. Typically, data structures, that are stored in computer memory, contain among other data, a type field and a pointer to a supertype field. To determine the type of data structure 105, the type field 105A is checked and data structure 105 is determined to be of type E. It may also be necessary to determine if type E is a subtype of another type, for example it may be necessary to determine if type E is a subtype of type B. This is accomplished by checking the supertype pointer field 105b of data structure 105. Supertype pointer field 105b provides a pointer to the supertype of type E. The pointer is dereferenced to obtain type E's supertype (i.e. type D located at typefield 106a of data structure 106). Likewise, the supertype of type D is determined by obtaining a pointer to D's supertype and dereferencing the pointer. The process is continued until it is determined that type B is supertype of type E (or conversely that type E is a subtype of type B). In general, this process is done recursively until it is determined that a given type (e.g., type E) is a subtype of another type (e.g., type B) or until a root type is reached. In system 100, type A is a root type, that is type A is not a subtype of any other type. This is indicated by the fact that supertype pointer field 109B is null.

In system 100, each time a supertype pointer is obtained and dereferenced the process requires memory access. Such recursive memory access taxes processing resources and is time consuming.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

The present invention provides methods and apparatuses for allowing faster data structure type checking. In one embodiment, the prior art data structure that includes a type field, and a field for storing a pointer to the supertype of the data structure type is replaced by a data structure that includes a sub-root log to store successive supertypes (type hierarchy references) of the data structure type hierarchy. Alternatively, the type data structure may not contain the sub-root log, but may contain a pointer to the sub-root log. Currently, typical applications have at most seven type-hierarchy references with a majority having no more than three. This means that by implementing a sub-root log storing six hierarchy references within the data structure, virtually all, typical, applications can be type checked without recourse to the recursive prior art method. In one embodiment, three fields are used to store the three successive references to a given type's supertype hierarchy. In an alternative embodiment, all references to a given type's supertype hierarchy may be stored in a type data structure. In another alternative embodiment, the number of supertype references used may be dynamically determined at run time for a given application.

Figure 1:
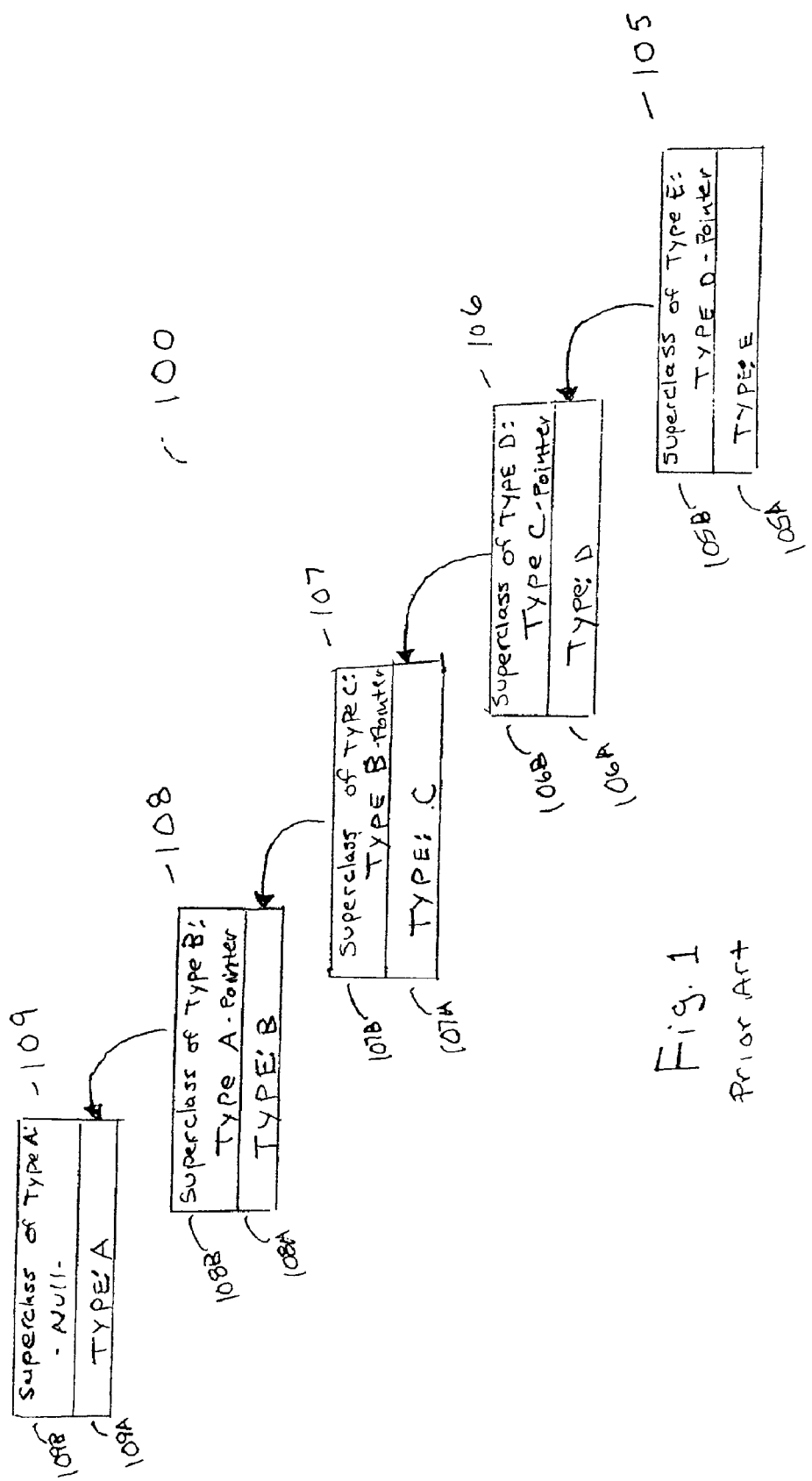
FIG. 1 illustrates a type checking process in accordance with the prior art.
Figure 2:
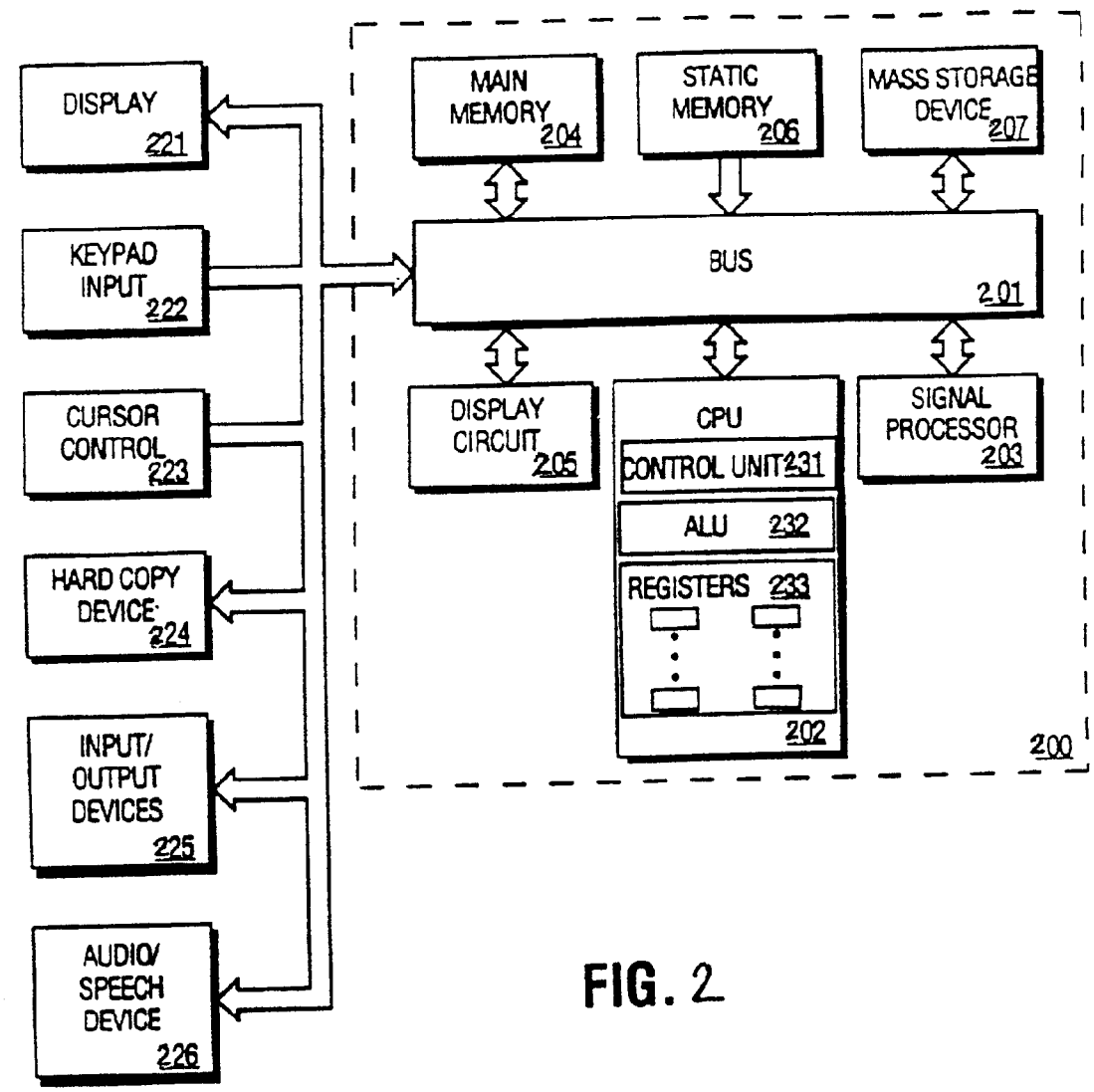
FIG. 2 is a diagram illustrating an exemplary computing system 200 for implementing a fast type checking method in accordance with an embodiment of the present invention.

FIG. 2 is a diagram illustrating an exemplary computing system 200 for implementing a fast type checking method in accordance with an embodiment of the present invention. A data structure containing multiple, successive, type hierarchy elements can be implemented and utilized within computing system 200, which can represent a general-purpose computer, portable computer, or other like device. The components of computing system 200 are exemplary in which one or more components can be omitted or added. For example, one or more memory devices can be utilized for computing system 200.

Referring to FIG. 2, computing system 200 includes a central processing unit 202 and a signal processor 203 coupled to a display circuit 205, main memory 204, static memory 206, and mass storage device 207 via bus 201. Computing system 200 can also be coupled to a display 221, keypad input 222, cursor control 223, hard copy device 224, input/output (I/O) devices 225, and audio/speech device 226 via bus 201.

Bus 201 is a standard system bus for communicating information and signals. CPU 202 and signal processor 203 are processing units for computing system 200. CPU 202 or signal processor 203 or both can be used to process information and/or signals for computing system 200. CPU 202 includes a control unit 231, an arithmetic logic unit (ALU) 232, and several registers 233, which are used to process information and signals. Signal processor 203 can also include similar components as CPU 202.

Main memory 204 can be, e.g., a random access memory (RAM) or some other dynamic storage device, for storing information or instructions (program code), which are used by CPU 202 or signal processor 203. Main memory 204 may store temporary variables or other intermediate information during execution of instructions by CPU 202 or signal processor 203. Static memory 206, can be, e.g., a read only memory (ROM) and/or other static storage devices, for storing information or instructions, which can also be used by CPU 202 or signal processor 203. Mass storage device 207 can be, e.g., a hard or floppy disk drive or optical disk drive, for storing information or instructions for computing system 200.

Display 221 can be, e.g., a cathode ray tube (CRT) or liquid crystal display (LCD). Display device 221 displays information or graphics to a user. Computing system 200 can interface with display 221 via display circuit 205. Keypad input 222 is an alphanumeric input device with an analog to digital converter. Cursor control 223 can be, e.g., a mouse, a trackball, or cursor direction keys, for controlling movement of an object on display 221. Hard copy device 224 can be, e.g., a laser printer, for printing information on paper, film, or some other like medium. A number of input/output devices 225 can be coupled to computing system 200. Data structures containing multiple type hierarchy references, in accordance with the present invention, can be implemented by hardware and/or software contained within computing system 200. For example, CPU 202 or signal processor 203 can execute code or instructions stored in a machine-readable medium, e.g., main memory 204.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figure 3:
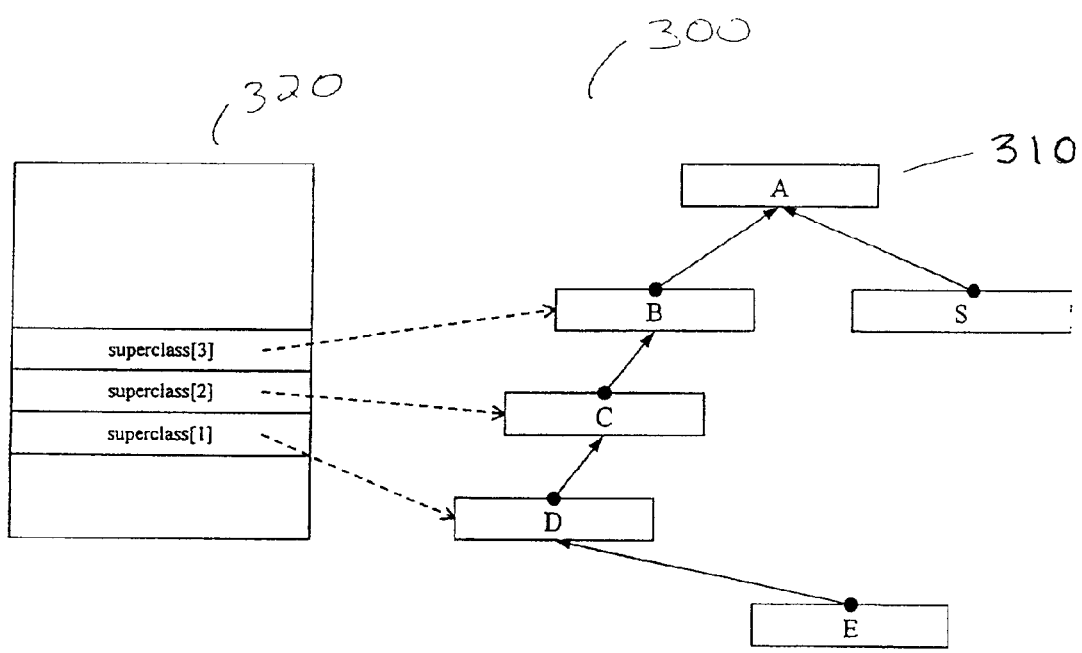
FIG. 3 illustrates a type hierarchy tree and a corresponding data structure in accordance with one embodiment of the present invention.

FIG. 3 illustrates a type hierarchy tree and a corresponding type data structure in accordance with one embodiment of the present invention. System 300, shown in FIG. 3, contains a type hierarchy tree 310 in which type A is a root type. The type hierarchy tree 310 may also illustrate a portion of a larger type hierarchy tree. As illustrated by the type hierarchy tree, type A is a supertype of type B, type B is a supertype of type C, type C is a supertype of type D, and type D is a supertype of type E. As shown, type A is also a supertype of type S. In languages such as JAVA and C#, a given type may have more than one subclass, but each type may have at most one supertype. That is, multiple inheritances are not allowed, a type may inherit from at most one supertype.

In accordance with an embodiment of the present invention, at run time, objects that are of type E are represented with data structure 320 that contains multiple references to the type hierarchy tree. A small piece of memory is used to cache the references. In one embodiment, the cache may contain some subset of the entire type hierarchy tree, for example, three references. Alternatively, all of the references to type E's supertypes may be cached.

Therefore, the present invention allows, in one embodiment the quick determination of type hierarchy. For example, if it is necessary to determine if type B is a supertype of type E, it is only necessary to examine the data structure of E which contains three supertype reference levels including type B. If the supertype level to be checked is greater than that contained within the type data structure, then a recursive process may be used. For example, if it is necessary to determine whether type A is a supertype of type E, the data structure of type E is examined. Type B is determined to be the highest referenced supertype of type E. The data structure of type B is then examined and type A is determined to be supertype of type B, and hence type A is determined to be a supertype of type E as well.

Empirically it is found that a data structure containing three type hierarchy reference levels is sufficient to allow type checking without resort to a recursive process for a majority of applications. The type hierarchy tree for most typical applications contains no more than seven levels. A data structure containing a root tree log with six references, therefore, may suffice to provide fast type checking without referring to the data structure of an intermediate supertype.

It will be appreciated that the method of the present invention contemplates any number of root tree log references, with the number implemented dependent on the specific application and such practical concerns as memory resources versus processing resources.

Figure 4:
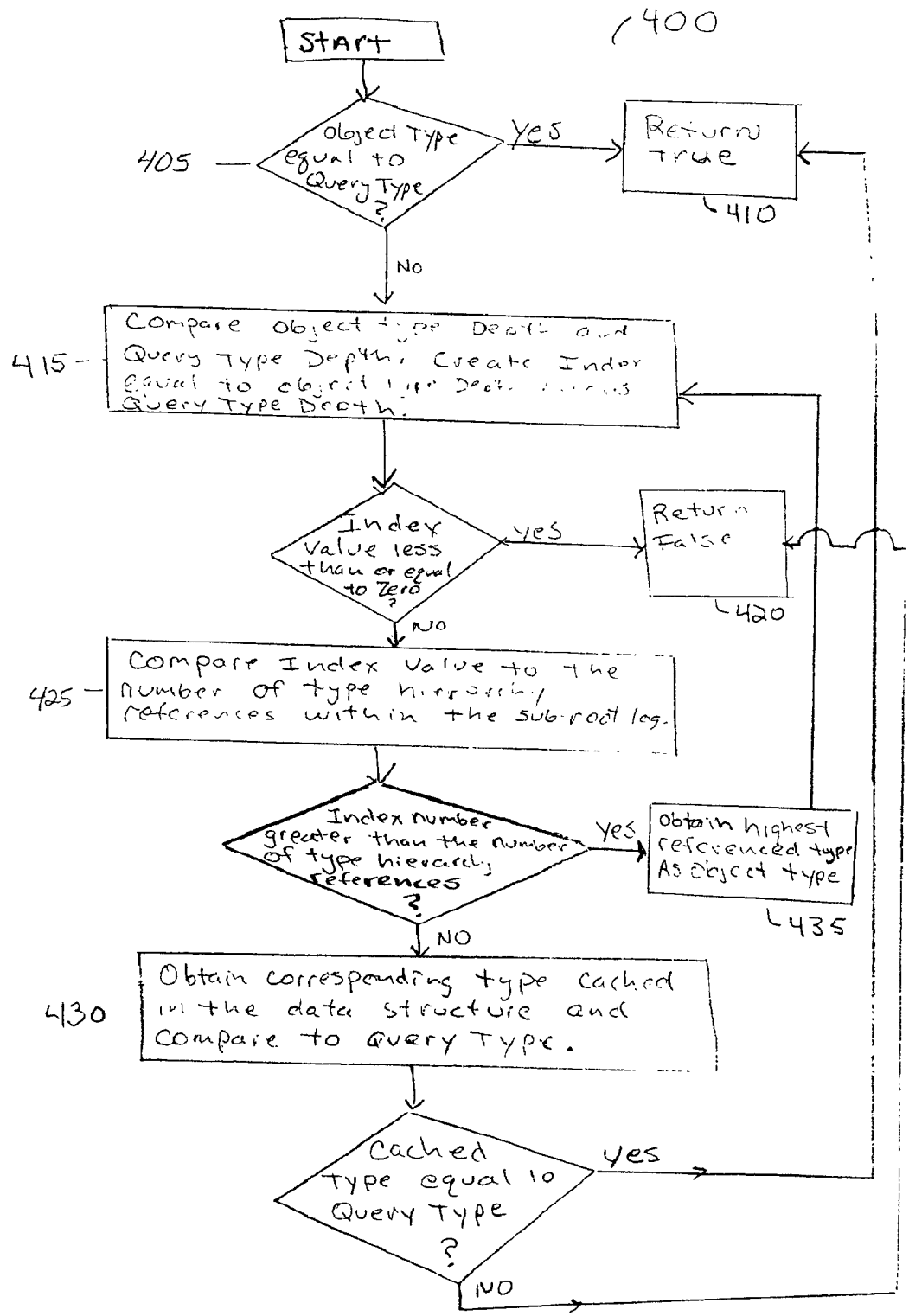
FIG. 4 is a process flow diagram in accordance with one embodiment of the present invention.

FIG. 4 is a process flow diagram in accordance with one embodiment of the present invention. The process 400 may be used to determine if object X is of type Y; typically, is type Y (a query type) a supertype of the type of which object X is a member (the object type). The process 400, shown in FIG. 4, begins at operation 405 in which an evaluation is made to determine if the type of object X is equal to type Y (that is, is object X of type Y). If so, the process returns true at operation 410. If not, the process continues at operation 415 in which the depth of type X and type Y within the type hierarchy tree is compared. An index value equal to the depth value of type X minus the depth value of type Y is computed. If the index value is less than or equal to zero (i.e., type Y is deeper than type X), this indicates that type Y is impossible to be a supertype of type X and the process returns false at operation 420. If the index value is more than zero then the index value is compared to the number of type hierarchy references within the sub-root log at operation 425. If the index is equal to or smaller than the number of type hierarchy references then the corresponding type cached in the data structure is obtained and compared to type Y at operation 430. The process returns true if the two types are equal.

If the index is larger than the number of type hierarchy references in the sub-root log, then type Y is not cached within the data structure. The highest referenced type is obtained at operation 435 and repeat the process recursively from operation 415.

An exemplary pseudo-code implementation for a JAVA language instruction to determine an object's type is included as Appendix A. The pseudocode of Appendix A begins by reverting to the recursive method of the prior art for the more complex cases where the query type (classT) is an array or an interface type. An array type is a type that comprises multiple components of another type and an interface type is a type without real features. In one embodiment, the recursive method of the prior art can be employed to handle these more complex types.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

APPENDIX A

The exemplary pseudo-code below is an implementation for a JAVA language instruction to determine an object's type. The source object is ObjectX and the query type for checking is Class Y.

```
if (! (ClassY is array || ClassY is interface)) {
    // get the depth in type hierarchy
    DepthY = getClassDepth ( ClassY );
    // get type of instance ObjectX, jitted instructions start here
    ClassX = getClassType ( ObjectX );
    if ( ClassX = = ClassY )// fastest path for common case
        return TRUE;
retry:
    DepthX = getClassDepth ( ClassX );
    // get the slot index in superclasses cache array,
    // here we use three slots for type hierarchy cache,
    // slot #0 for its father type, #1 for father's father,
    // #2 for father's father's father
    index = DepthX − DepthY;
    if (index <=0)
        return FALSE;
    //SLOT_NUMBER = = 3
    if (index >SLOT_NUMBER) { //not cached here
        //recursively get father's father's father type
        ClassX = getSlot (SLOT_NUMBER −1);
        goto retry;
    }
    // get the cached type for real comparison
        getSlot (index − 1) = = ClassY;
}
```

What is claimed is:

1. A computer-implemented method comprising:
    caching a plurality of successive type hierarchy references corresponding to a data object within the data structure of the data object; and
    accessing the cached type hierarchy references at run time to perform type checking of the data object by
    determining, for a query type, that is within the portion of the plurality of successive type hierarchy references, if a data object type corresponding to the data object, is the query type, and if not
    comparing a first number corresponding to a number of supertypes of the data object type within the plurality of successive type hierarchy references to a second number corresponding to a number of supertypes of the query type within the plurality of successive type hierarchy references;
    determining that the data object type is not the query type if the first number is not greater than the second number; and
    comparing the query type to a corresponding type hierarchy reference and determining that the data object type is the query type if the query type and the corresponding type hierarchy are equal.

2. The method of claim 1 wherein the plurality of successive type hierarchy references are cached in a data structure of the data object.

3. The method of claim 2 wherein the data structure is a data structure of an object oriented computer language.

4. The method of claim 3 wherein the object oriented computer language is selected from the list consisting of JAVA, C++, C#, and CLI.

5. The method of claim 1 wherein the plurality of successive type hierarchy references comprises three successive type hierarchy references.

6. The method of claim 1 wherein the plurality of successive type hierarchy references comprises a maximum number of successive type hierarchy references based upon a specific application requiring type checking of the data object.

7. The method of claim 1 wherein the plurality of successive type hierarchy references comprises a number of successive type hierarchy references, the number of successive type hierarchy references dynamically determined at run time.

8. The method of claim 1, wherein the plurality of successive type hierarchy references is a portion of a greater plurality of successive type hierarchy references, further comprising:
    a) determining that the query type is not within the plurality of successive type hierarchy references;
    b) obtaining a highest type hierarchy reference of the plurality of successive type hierarchy references from the cache;
    c) accessing a subsequent data object, the subsequent data object referenced by the highest type hierarchy reference, the subsequent data object having a subsequent portion of the greater plurality of successive type hierarchy references corresponding to the subsequent data object; and
    d) accessing the subsequent portion of the greater plurality of successive type hierarchy references and determining that the query type is within the subsequent portion of the greater plurality of successive type hierarchy references;
    e) comparing a first number corresponding to a number of supertypes of the data object type within the subsequent portion of the greater plurality of successive type hierarchy references to a second number corresponding to a number of supertypes of the query type within the plurality of successive type hierarchy references;
    f) determining that the data object type is not the query type if the first number is not greater than the second number; and
    g) comparing the query type to a corresponding type hierarchy reference and determining that the data object type is the query type if the query type and the corresponding type hierarchy are equal.

9. A machine-readable medium provides executable instructions which, when executed by a processor, cause the processor to perform a method, the method comprising:
    caching a plurality of successive type hierarchy references corresponding to a data object within a data structure of the data object; and
    accessing the cached type hierarchy references at run time to perform type checking of the data object by
    determining, for a query type, that is within the portion of the plurality of successive type hierarchy references, if a data object type corresponding to the data object, is the query type, and if not
    comparing a first number corresponding to a number of supertypes of the data object type within the plurality of successive type hierarchy references to a second number corresponding to a number of supertypes of the query type within the plurality of successive type hierarchy references;
    determining that the data object type is not the query type if the first number is not greater than the second number; and
    comparing the query type to a corresponding type hierarchy reference and determining that the data object type is the query type if the query type and the corresponding type hierarchy are equal.

10. The machine-readable medium of claim 9 wherein the plurality of successive type hierarchy references are cached in a data structure of the data object.

11. The machine-readable medium of claim 10 wherein the data structure is a data structure of an object oriented computer language.

12. The machine-readable medium of claim 11 wherein the object oriented computer language is selected from the list consisting of JAVA, C++, C#, and CLI.

13. The machine-readable medium of claim 9 wherein the plurality of successive type hierarchy references comprises three successive type hierarchy references.

14. The machine-readable medium of claim 9 wherein the plurality of successive type hierarchy references comprises a maximum number of successive type hierarchy references based upon a specific application requiring type checking of the data object.

15. The machine-readable medium of claim 9 wherein the plurality of successive type hierarchy references comprises a number of successive type hierarchy references, the number of successive type hierarchy references dynamically determined at run time.

16. The machine-readable medium of claim 9 wherein the method further comprises:
   a) determining that the query type is not within the plurality of successive type hierarchy references;
   b) obtaining a highest type hierarchy reference of the plurality of successive type hierarchy references from the cache;
   c) accessing a subsequent data object, the subsequent data object referenced by the highest type hierarchy reference, the subsequent data object having a subsequent portion of the greater plurality of successive type hierarchy references corresponding to the subsequent data object; and
   d) accessing the subsequent portion of the greater plurality of successive type hierarchy references and determining that the query type is within the subsequent portion of the greater plurality of successive type hierarchy references;
   e) comparing a first number corresponding to a number of supertypes of the data object type within the subsequent portion of the greater plurality of successive type hierarchy references to a second number corresponding to a number of supertypes of the query type within the plurality of successive type hierarchy references;
   f) determining that the data object type is not the query type if the first number is not greater than the second number; and
   g) comparing the query type to a corresponding type hierarchy reference and determining that the data object type is the query type if the query type and the corresponding type hierarchy are equal.

17. An apparatus comprising:
   a cache memory having stored therein a plurality of successive type hierarchy references corresponding to a data object;
   a main memory having stored therein instructions; and
   a processor to execute the instructions such that execution of the instructions causes the processor to access the cached type hierarchy references at run time to perform type checking of the data object by
   determining, for a query type, that is within the portion of the plurality of successive type hierarchy references, if a data object type corresponding to the data object, is the query type, and if not
   comparing a first number corresponding to a number of supertypes of the data object type within the plurality of successive type hierarchy references to a second number corresponding to a number of supertypes of the query type within the plurality of successive type hierarchy references;
   determining that the data object type is not the query type if the first number is not greater than the second number; and
   comparing the query type to a corresponding type hierarchy reference and determining that the data object type is the query type if the query type and the corresponding type hierarchy are equal.

18. The apparatus of claim 17 wherein the data object includes a data structure, the data structure storing the plurality of successive type hierarchy references.

19. The apparatus of claim 17 wherein the data object includes a data structure, the data structure storing a pointer to a sub-root log, the sub-root log storing the plurality of successive type hierarchy references.

20. The apparatus of claim 17 wherein the instructions include code of an object oriented computer language.

21. The apparatus of claim 17 wherein the plurality of successive type hierarchy references comprises a maximum number of successive type hierarchy references based upon a specific application requiring type checking of the data object.

22. The apparatus of claim 17 wherein the plurality of successive type hierarchy references comprises a number of successive type hierarchy references, the number of successive type hierarchy references dynamically determined at run time.

23. The apparatus of claim 17 wherein the main memory stores further instructions such that execution of the further instructions causes the processor to:
   a) determining that the query type is not within the plurality of successive type hierarchy references;
   b) obtaining a highest type hierarchy reference of the plurality of successive type hierarchy references from the cache;
   c) accessing a subsequent data object, the subsequent data object referenced by the highest type hierarchy reference, the subsequent data object having a subsequent portion of the greater plurality of successive type hierarchy references corresponding to the subsequent data object; and
   d) accessing the subsequent portion of the greater plurality of successive type hierarchy references and determining that the query type is within the subsequent portion of the greater plurality of successive type hierarchy references;
   e) comparing a first number corresponding to a number of supertypes of the data object type within the subsequent portion of the greater plurality of successive type hierarchy references to a second number corresponding to a number of supertypes of the query type within the plurality of successive type hierarchy references;
   f) determining that the data object type is not the query type if the first number is not greater than the second number; and
   g) comparing the query type to a corresponding type hierarchy reference and determining that the data object type is the query type if the query type and the corresponding type hierarchy are equal.

* * * * *